(12) United States Patent
Debonis

(10) Patent No.: US 11,549,061 B2
(45) Date of Patent: Jan. 10, 2023

(54) PROCESS FOR HYDROPROCESSING OF BIOLOGICAL FEEDSTOCKS

(71) Applicant: Axens, Rueil-Malmaison (FR)

(72) Inventor: Dominic Debonis, Tinton Falls, NJ (US)

(73) Assignee: Axens, Rueil-Malmaison (FR)

( * ) Notice: Subject to any disclaimer, the term of this patent is extended or adjusted under 35 U.S.C. 154(b) by 116 days.

(21) Appl. No.: 16/923,152

(22) Filed: Jul. 8, 2020

(65) Prior Publication Data
US 2022/0010220 A1 Jan. 13, 2022

(51) Int. Cl.
| | |
|---|---|
| *C10G 65/12* | (2006.01) |
| *C10G 69/08* | (2006.01) |
| *C10G 3/00* | (2006.01) |
| *C10G 67/06* | (2006.01) |
| *C10L 3/12* | (2006.01) |

(52) U.S. Cl.
CPC ............. *C10G 3/52* (2013.01); *C10G 65/12* (2013.01); *C10G 67/06* (2013.01); *C10G 69/08* (2013.01); *C10L 3/12* (2013.01); *C10G 2300/1014* (2013.01); *C10G 2300/1018* (2013.01); *C10G 2300/202* (2013.01); *C10G 2300/207* (2013.01); *C10G 2300/4006* (2013.01); *C10G 2300/4012* (2013.01); *C10G 2300/4018* (2013.01); *C10G 2400/28* (2013.01); *C10L 2200/0484* (2013.01); *C10L 2290/542* (2013.01); *C10L 2290/543* (2013.01); *C10L 2290/545* (2013.01)

(58) Field of Classification Search
None
See application file for complete search history.

(56) References Cited

U.S. PATENT DOCUMENTS

| | | | | |
|---|---|---|---|---|
| 2009/0253947 | A1* | 10/2009 | Brandvoid | C10G 65/00 585/14 |
| 2012/0198760 | A1* | 8/2012 | Blommel | C10G 3/50 44/437 |
| 2013/0324775 | A1* | 12/2013 | Quignard | C10G 69/10 585/319 |
| 2015/0344382 | A1* | 12/2015 | Eizenga | C10G 3/49 422/187 |
| 2017/0137294 | A1* | 5/2017 | Marker | C10L 1/06 |
| 2018/0216010 | A1* | 8/2018 | Hong | C10G 7/00 |
| 2019/0330546 | A1* | 10/2019 | Plennevaux | C10G 65/12 |
| 2019/0382672 | A1* | 12/2019 | Sorensen | C10B 53/02 |
| 2020/0181503 | A1* | 6/2020 | Myllyoja | B01J 23/883 |

\* cited by examiner

*Primary Examiner* — Tam M Nguyen

(57) ABSTRACT

The invention relates to an improved apparatus and methods for managing and utilizing light hydrocarbons utilized and created during the hydroprocessing of biological feedstocks in the making of middle distillate fuels.

44 Claims, 1 Drawing Sheet

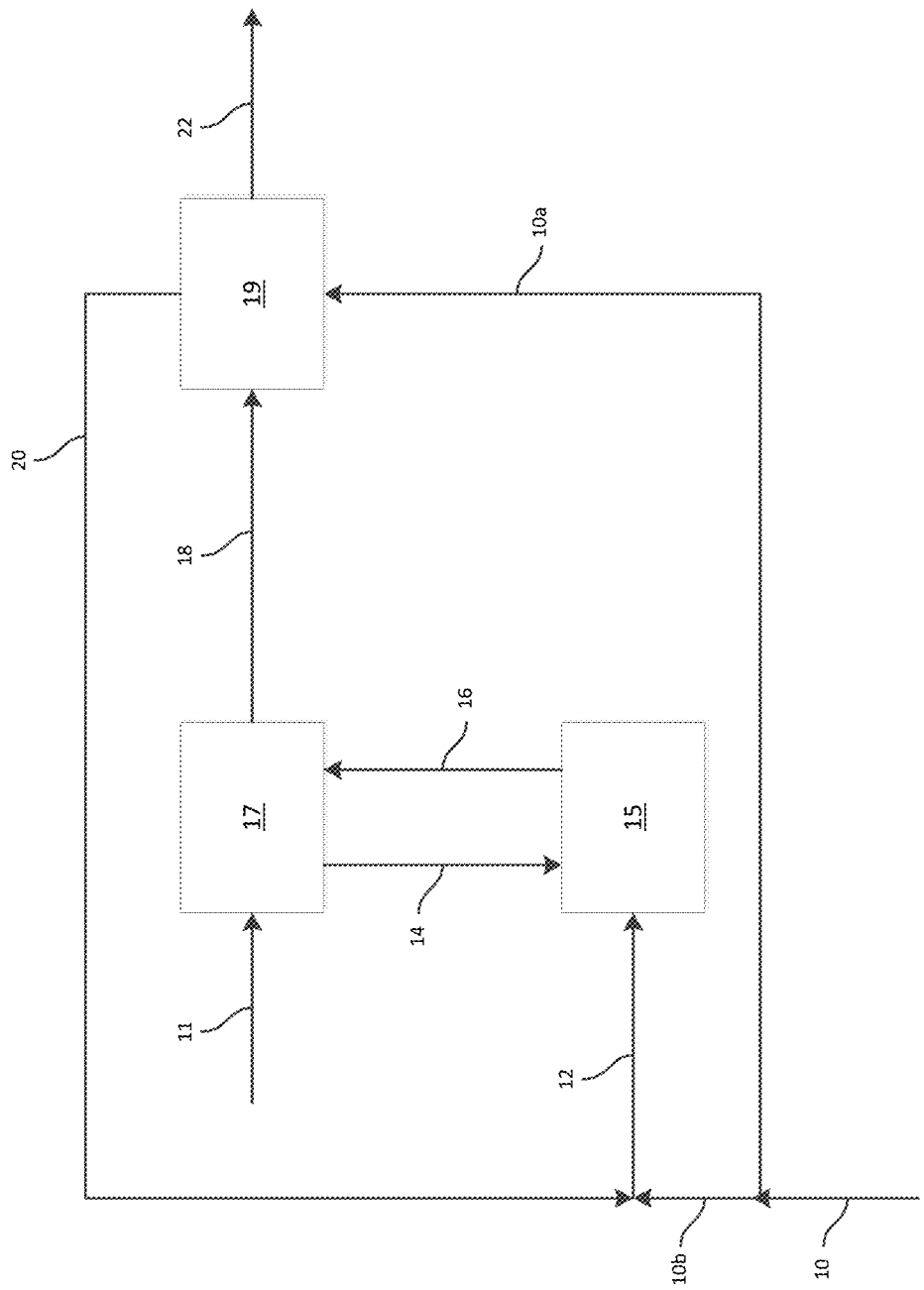

PROCESS FOR HYDROPROCESSING OF BIOLOGICAL FEEDSTOCKS

FIELD OF THE INVENTION

The invention relates to an improved apparatus and methods for managing and utilizing light ends, namely propane, generated during the hydroprocessing of biological feedstocks in the making of middle distillate fuels.

BACKGROUND

Recent years have been marked by the rapid growth in need of fuels, in particular diesel fuel bases in the European community, and also by the importance of the problems related to global warming and the emission of greenhouse gases. The result is a desire to reduce energy dependence on fossil-based raw materials and on reducing CO2 emissions.

In this context, the search for new methods to manufacture fuels from renewable sources that can be easily integrated into the traditional pattern of refining and fuel production is an issue of increasing importance. As such, the integration into the refining process of new products of biological origin, resulting from the conversion of lignocellulosic biomass or from the production of vegetable oils or animal fats, has in recent years experienced a growing interest due to the rising cost of fossil fuels. Applicant's invention focuses on the latter, the production biofuels commonly from vegetable oil and animal fat byproducts. For a broad overview of green diesel technologies and catalysts used therein please see Green Diesel: Biomass Feedstocks, Production Technologies, Catalytic Research, Fuel Properties and Performance in Compression Ignition Internal Combustion Engines" by Douvartzides S., Charisiou N., Papageridis K., and Goula M. *Energies* 2019, 12, 809 which is hereby incorporated by reference.

In addition, the processes known to date using vegetable oils or animal fats are resource intensive and produce $CO_2$, known for its negative effects on the environment. A more integrated process in the production of these bio-fuels would therefore be a definite advantage.

The production of fuel bases is therefore increasingly identified as an attractive new outlet for the agricultural world, especially for vegetable oil producers, who grind oilseeds such as rapeseed, soya beans or sunflower seeds. In fact, these vegetable oils consist of fatty acids in the form of triglycerides having long alkyl chains whose structure corresponds to the normal paraffins of the gas oil and kerosene cuts (chain length of 12 to 24 carbon atoms, depending on the nature of the vegetable oil). Incompatible with modern diesel engines in their natural state, these vegetable oils must be transformed beforehand.

Two chemical pathways for the conversion of these biological feedstocks to middle distillate fuels is commonly used: transesterification and hydroprocessing.

The transesterification reaction utilizes an alcohol such as methanol leading to methyl esters of vegetable oils (VOME) commonly called biodiesel. This path is now widely used in Europe since the production of VOME has increased dramatically in the last ten years, reaching 1.5 Mt in 2003 (the average annual growth rate was 35% between 1992 and 2003). This production is supported in particular by the European directive on the promotion of biofuels (2003/30/EC), which sets increasing targets for biofuel consumption in the transport sector. These consumptions will have to represent at least 20/0 in 2005, 5,750/0 in 2010 and 8% (percentages measured in energy) in 2015 of the global consumption of gasoline and diesel fuel used in transport. However, this type of process is relatively expensive and requires limiting the type of vegetable oils to meet biodiesel specifications. In addition, the charges for this type of process must be carefully selected, such that a number of vegetable oils cannot be treated in this way. Finally, the cold flow properties of these products are also a limiting factor.

As mentioned above, the hydroprocessing approach consists in directly exploiting vegetable oils via their transformation into elemental fatty acid derivatives, by means of hydrotreatment or hydroconversion processes whose catalysts are also well known to those skilled in the art for their hydrodeoxygenation properties. (See e.g. E. Laurent, Delmon B., Catal. App., 1994, Vol. 109, issue 1, p. 77-97 and Sunflower oil to green diesel over Raney-type Ni-catalyst" by Onyestyak G., Harnow S., Szegedi A., and Kallo D both hereby incorporated by reference. Hydroprocessing has been used more frequently commercially due to its ability to produce hydrocarbon product with greater stability and ease of blending with hydrocarbons derived from mineral oil. In this case, the triglycerides are converted into mainly paraffinic and saturated derivatives, thus constituting excellent hydrocarbon bases for the diesel fuel pool because of their good cetane numbers.

In a typical renewable diesel plant configuration, hydrogen from a hydrogen plant is fed along with pretreated biological feedstock for hydroprocessing, including a hydrotreatment step and an isomerization step.

The biological feedstock generally needs to be pretreated because, contaminants contributing to the presence of trace elements in animal fats and/or plant oils, hinder the ability to catalytically convert these feedstocks to hydrocarbons during hydroprocessing. For example, certain elements and compounds containing these elements (e.g., phosphorous, phosphorous-containing compounds, and metals such as calcium and magnesium) poison or reduce the activity of hydroprocessing catalysts, thereby shortening their useful life and consequently increasing the overall cost of biofuel production. Treating methods to reduce certain contaminants of the fatty acid- or triglyceride-containing component (and therefore contaminants of the feedstock), to the greatest extent possible, therefore provide important commercial advantages in the hydroprocessing of biological feedstocks to middle distillate products. A wide variety of different pretreatment schemes have been reported, each offering different advantages and disadvantages.

The hydrotreatment of triglycerides includes several different reactions. In the first reaction, hydrogen is added to saturate the double bonds of the unsaturated vegetable oil triglycerides. In the second reaction, hydrogen is added to remove the propane backbone, hereby converting the saturated vegetable oil triglycerides to fatty acids. Finally, the fatty acids either undergo hydrodeoxygenation (by addition of more hydrogen the oxygen leaves as $H_2O$) or decarboxylation (oxygen leaves as $CO_2$ without further addition of hydrogen), or a combination of these two. The result is a mixture of straight chain paraffinic hydrocarbons. Shown below is the reaction pathway for the hydrotreatment process.

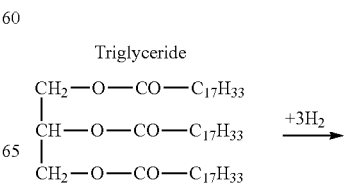

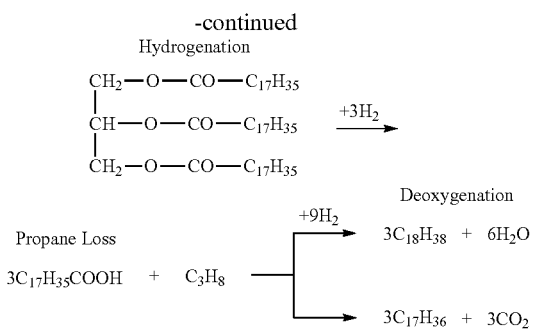

The alkane isomerisation and cracking step thereafter brings the biofuel to a quality that equals or surpasses specifications for conventional petroleum fuels.

Effluent from the hydroprocessing section is thereafter processed to separate the lightend components from the liquid portion of the effluent. This can be accomplished in a number of ways including being sent to a stripper column where one or more components are removed from a liquid stream by a stripping vapor stream, often superheated steam, to create the hydrocarbon fuel product. Alternatively, the effluent can be sent to a reboiled distillation column to separate the light ends.

It is also common whether in the same distillation column where light ends are separated or in a separate distillation column, for the liquid effluent to be separated into separate liquid products; often these liquid products may include a naphtha product, a kerosene product, and/or a diesel or gasoil product.

The invention described herein will focus on the interaction between the hydroprocessing zone and the hydrogen plant section. The hydrotreating section creates several byproducts; some byproducts such as water are a result of the hydrotreating reactions and some light ends are produced through slight cracking that occurs as a side reaction. One of the major byproducts of hydrotreating triglycerides is propane. Management of the propane is therefore an important consideration. When the reactor effluent is separated into vapor and liquid, propane must be removed from the hydrotreating loop; propane that is not adequately removed will build in the recycle gas, thus diluting the purity of hydrogen sent to the hydrotreating reactor.

Current state of the art commonly releases propane in one of two ways. The first discharge of propane is often a high pressure vapor purge from the hydrotreating loop; this may be useful to send the propane to the hydrogen plant or for purification, however the purge stream has a high concentration of valuable hydrogen gas that can complicate or oversize the destination of the purge stream. The second discharge of propane is often a low pressure vent from a column removing light ends from the liquid hydrotreating effluent; this method often uses the propane as low-value fuel or requires significant compression to send the propane to another destination. The propane generated by the hydrotreating reactions is often too excessive an amount to be used as fuel for operation of the hydrogen plant and thus may wastefully burn propane without generating value. In light of the above, there is a need for a processing scheme that more efficiently and effectively manages and utilizes the propane generated from the hydroprocessing of biological feedstocks in the making of middle distillates.

It is therefore an object of the invention to create a process for efficiently and effectively utilizing light ends streams in conjunction with the hydroprocessing of biological feedstocks comprising:

a) feeding a pretreated biological feedstock and a hydrogen stream to a hydroprocessing zone that utilizes at least one solid catalyst to catalyze hydrotreatment reactions and produce a hydroprocessing liquid effluent;
b) feeding said hydroprocessing liquid effluent and a light hydrocarbon stripping medium to a light ends recovery zone wherein said light hydrocarbon stripping medium is contacted with said hydroprocessing liquid effluent to create a recovered light ends stream and a gas stripped liquid effluent stream; and
c) feeding said recovered light ends stream to a hydrogen production zone wherein said hydrogen production zone utilizes the hydrocarbons in said recovered light ends stream as feedstock to create at least a portion of said hydrogen stream utilized in step (a).

It is yet a further object of the invention to create a process for efficiently and effectively utilizing light ends streams in conjunction with the hydroprocessing of biological feedstocks comprising:

a) feeding a pretreated biological feedstock and a hydrogen stream to a hydroprocessing zone that utilizes at least one solid catalyst to catalyze hydrotreatment reactions and produce a hydroprocessing liquid effluent;
b) feeding said hydroprocessing liquid effluent and a light hydrocarbon stripping medium to the light ends recovery zone wherein said light hydrocarbon stripping medium is contacted with said hydroprocessing liquid effluent to create a recovered light ends stream and a stripped liquid effluent stream;
c) feeding said recovered light ends stream to a light ends separation zone to create an LPG stream and a light residual gas stream; and
d) feeding said light residual gas stream to a hydrogen production zone wherein said hydrogen production zone utilizes the hydrocarbons in said residual gas stream as feedstock to create at least a portion of said hydrogen stream utilized in step (a).

It is another object of the invention to create a process for efficiently and effectively utilizing light ends streams in conjunction with the hydroprocessing of biological feedstocks comprising:

a) feeding a pretreated biological feedstock and a hydrogen stream to a hydroprocessing zone that utilizes at least one solid catalyst to catalyze hydrotreatment reactions and produce a hydroprocessing liquid effluent;
b) feeding said hydroprocessing liquid effluent and a light hydrocarbon stripping medium to a light ends recovery zone wherein said light hydrocarbon stripping medium is contacted with said hydroprocessing liquid effluent to create a recovered light ends stream and a gas stripped liquid effluent stream;
c) feeding said gas stripped liquid effluent stream to a secondary hydroprocessing zone that utilizes at least one secondary solid catalyst to catalyze additional hydroprocessing reactions to produce a secondary hydroprocessing liquid effluent;
d) feeding said recovered light ends stream to a hydrogen production zone wherein said hydrogen production zone utilizes the hydrocarbons in said recovered light ends stream as feedstock to create a hydrogen rich vapor effluent stream;
e) feeding said hydrogen rich vapor effluent stream to said secondary hydroprocessing zone; and
wherein excess hydrogen from said secondary hydroprocessing zone is thereafter cascaded to said hydroprocessing zone.

SUMMARY OF THE INVENTION

The invention relates to a process for efficiently and effectively utilizing light ends streams during the process of converting biological feedstocks to middle distillate hydrocarbon fuels.

BRIEF DESCRIPTION OF THE DRAWINGS

FIG. 1 shows a schematic of Applicant's novel method for efficiently and effectively utilizing light ends streams during the process of converting biological feedstocks to middle distillate range hydrocarbons.

DETAILED DESCRIPTION OF THE INVENTION

FIG. 1 shows a schematic of Applicant's novel method for efficiently and effectively utilizing light ends streams during the process of converting biological feedstocks to middle distillate range hydrocarbon fuel.

As used herein "hydrotreating or hydrotreatment" means chemical reactions between the hydrocarbon feedstock and hydrogen including hydrodenitrification, hydrodesulfurization, hydrodeoxygenation, hydrogenolysis, alkene saturation, and olefin saturation; this term will also be used herein to include decarboxylation and decarbonylation, as these reactions occur as a competing reaction to hydrogenolysis simultaneously under the given reaction conditions.

As used herein a "hydroprocessing zone" means a zone in which the hydrotreatment and/or hydroprocessing reactions occur between the hydrocarbon feedstock and hydrogen when contacted with the catalyst bed. The hydroprocessing zone may also include, in addition to the catalyst bed(s), one or more of the following: separation of liquid stream(s) and vapor stream(s) downstream of the catalyst bed(s), a recycle gas loop, recycle liquid loop(s), amine separation for removal of hydrogen sulfide and/or carbon dioxide. Further, the hydroprocessing zone may also include an isomerization and/or hydrocracking step with different catalysts to facilitate isomerization/hydrocracking of paraffinic hydrocarbons.

As used herein "middle distillates" means hydrocarbon fuels generally comprising primarily of hydrocarbon components boiling above 150° C. including, for example, kerosene, diesel, or gasoil.

As used herein "biological feedstocks" means vegetable oils, animal fats, tall oil, and derived material such as fatty acid alkyl esters, or combinations thereof. Vegetable oils include, but are not limited to, rapeseed oil, soybean oil, corn oil, coconut oil, olive oil, linseed oil, sunflower oil, palm oil, *Jatropha* oil, mustard oil, peanut oil, hemp oil, and cottonseed oil. Animal fats include, but are not limited to, pork fat, poultry fat, lard, butter and tallow.

As used herein, the term light ends or light hydrocarbons means chemical compounds lighter than pentane including methane, ethane, propane, n-butane, or isobutane. Such light hydrocarbons or "light ends" are often used in some hydrocarbon processing schemes as a feedstock and/or as a fuel.

As used herein LHSV is the liquid hourly space velocity, which is the ratio of liquid volume flow per hour to catalyst volume. A system with a flow rate 2 m³/h and 1 m³ of catalyst would have an LHSV of 2. (The units are 1/hr). LHSV is inversely proportional to residence time.

A pretreated biological feedstock stream 11 is fed along with a hydrogen stream 16 from a hydrogen production zone 15 to the hydroprocessing zone 17. The hydrogen production zone 15 is generally a section wherein hydrocarbon feed stream is utilized to chemically produce hydrogen gas.

Although not shown, it utilizes a "hydrogen generation step" such as Steam Methane Reforming (SMR), Autothermal Reforming, or Partial Oxidation. This zone often includes a sulfur guard upstream of the hydrogen generation step and a hydrogen purification step downstream of the hydrogen generation step. Additionally the hydrogen purification step commonly uses Pressure Swing Adsorption (PSA) but may also employ other means such as amine absorption, methanation, etc. Although Applicant will refer to steam reforming in this description, any hydrogen production technology known to those skilled in the art could be deployed for the same purpose.

In the hydrotreatment step, hydrogen from the hydrogen stream 16 is added to saturate the double bonds of the unsaturated vegetable oil triglycerides from the biological feedstock 11 and remove the propane backbone, thereby converting the saturated vegetable oil triglycerides to fatty acids. Finally, the fatty acids either undergo hydrodeoxygenation (by addition of more hydrogen the oxygen leaves as $H_2O$) or decarboxylation (oxygen leaves as $CO_2$ without further addition of hydrogen), or a combination of these two. The result is liquid hydroprocessing effluent stream 18 comprising a mixture of paraffinic hydrocarbons and light ends. This hydrotreatment step in the hydroprocessing zone 17 utilizes a solid catalyst to catalyze the hydrotreatment reactions.

Catalysts known in the art often use metals from group VIII such as nickel or cobalt alone or in combination with metals from group VIB such as molybdenum or tungsten. Catalyst types well known in the art are sulfided forms of NiMo, CoMo, and NiW on an alumina support as well as reduced nickel. Depending upon the specific biological feedstock, the reaction typically operates at reaction temperatures generally between 180° C. and 400° C., a pressure between 10 bar to 150 bar, and a LHSV of between 0.1 to 10 $h^{-1}$.

The hydroprocessing zone 17 may also include catalyst that allow the straight chain paraffinic hydrocarbons to undergo alkane isomerization and cracking after the hydrotreatment reactions have taken place. The isomerization/cracking catalyst may be present in stage independent of the hydrotreatment reactions or share a common stage with the hydrotreatment reactions. In these scenarios wherein the hydroprocessing zone 17 includes an isomerization/hydrocracking step, the hydroprocessing effluent stream 18 comprises the liquid effluent from the isomerization/hydrocracking step.

The hydroprocessing zone 17 may include equipment that allows excess hydrogen and/or liquid effluent in the reactor(s) to be recycled back to the reaction vessel(s). The hydroprocessing zone may also selectively separate carbon dioxide from the reactor effluent using techniques such as amine absorption or membrane separation.

The liquid hydroprocessing effluent stream 18 comprising a mixture of paraffinic hydrocarbons is thereafter fed, along with a light hydrocarbon stripping medium 10a to a light ends recovery zone 19. The light ends recovery zone can utilize a single stage contactor but typically will use a single vessel with multiple stages, such as a distillation column.

The light ends recovery zone 19 in Applicant's invention is operated at high pressure, and the light hydrocarbon stripping medium 10a that is utilized to remove propane from the hydroprocessing reactor liquid effluent, is also suitable and utilized as feed to the hydrogen production zone as will be explained in detail hereafter. The light hydrocarbon stripping medium 10a is typically a vapor stream composed primarily of light hydrocarbons such as methane or natural gas.

Using the same light hydrocarbon stripping medium as a feed stream to the hydrogen production zone 15 is advantageous because it must be present at moderate pressure in order to enter the system in which hydrogen is produced such as a steam reformer.

As such using it as a stripping medium in the light ends recovery zone 19 allows it to operate at high pressure.

Propane, a major byproduct of the hydrotreatment reactions, is a suitable feedstock to multiple hydrogen production processes. By utilizing the light ends recovery zone, the light ends produced in the hydroprocessing zone, namely propane, is able to be used in the production of hydrogen; this allows the hydrogen to be produced from, at least in part, a renewable feedstock and reduce the amount of feedstock that must be imported from other sources.

The hydroprocessing liquid effluent stream 18 is separated in the light ends recovery zone 19 into a recovered light ends vapor stream 20 and a gas stripped liquid effluent stream 22. The recovered light ends stream 20 generally comprises propane, other light ends produced in the hydroprocessing zone 17, and components in the light hydrocarbon stripping medium 10a.

The gas stripped liquid effluent stream 22 typically comprises paraffinic hydrocarbons and is thereafter suitable for further processing by any number of methods known to those skilled in the art into saleable products including diesel fuel, kerosene, jet fuel, gas oil, and/or naphtha. The gas stripped liquid effluent stream 22 may also contain dissolved light ends from the light hydrocarbon recovery zone; these light ends when separated after further processing may be utilized as fuel gas.

The hydrogen production zone 15 typically comprises a sulfur guard, a steam reformer, and a pressure swing adsorption (PSA) section (all not shown). A hydroprocessing zone purge stream 14 comprising hydrogen and other light ends is optionally sent to the hydrogen production zone 15 upstream of either the sulfur guard, steam reformer, or the PSA. If sent upstream of the steam reformer, hydrocarbons in the hydroprocessing zone purge stream 14 may be converted to hydrogen. The hydroprocessing zone purge stream 14 may alternatively be sent to the PSA if the conversion of the light ends in the stream is not required; this may be more desirable in some cases as the stream is often rich in hydrogen.

As mentioned above using the same light hydrocarbon stripping medium 10a as a feed stream to the hydrogen production zone 15 creates processing efficiencies. FIG. 1 shows this embodiment where a light hydrocarbon feed stream 10 is used as both the light hydrocarbon stripping medium 10a and also the hydrogen production zone feed stream 10b. The hydrogen production feed stream 10b is thereafter combined with the recovered light ends stream 20 and the combined stream 12 is utilized as fuel and sent to the hydrogen production zone 15.

Often the feed, be it natural gas or otherwise, to the hydrogen production zone 15 requires compression to reach the plant. In this scenario, the compressed feed may be used as the stripping medium as described above, but it is also possible to achieve a similar effect by operating the light ends recovery zone 19 at low pressure with the low pressure light ends feed stream 10a gas and then cascading the recovered light ends stream 20 to the compression step; this allows the recovered light ends stream 20 and the hydrogen production zone feed stream 10b to use shared equipment for compression.

Although not shown in FIG. 1, it's also possible that the gas stripped liquid effluent stream 22 could be first sent, along with the hydrogen stream 16, to an isomerization or hydrocracking step to create the middle distillate fuels and wherein excess hydrogen not utilized in the isomerization or hydrocracking process is thereafter cascaded to the hydroprocessing zone 17.

Although not shown and depending upon the specifications of the particular plant, the hydrogen production feed stream 10b and the light hydrocarbon stripping medium 10a may come from separate sources. Moreover, and although also not shown, the hydrogen production feed stream 10b and the recovered light ends stream 20 may be sent to the hydrogen production zone 15 in separate streams.

In some applications, it may be of value to recover the propane component of the recovered light ends stream 20 as a saleable liquid product. In this case and although not shown in FIG. 1, the recovered light ends stream 20 may be sent to a liquefied petroleum gas (LPG) recovery section.

The "Liquefied Petroleum Gas or LPG" is generally comprised of propane, butane, or a mixture thereof. The LPG recovery section may recover the propane utilizing membranes, fractionation, or some combination thereof. In this step, liquid saleable propane or LPG is removed from the recovered light ends stream 20. The remaining recovered light ends stream 20 which comprises light gases such as methane and/or ethane may thereafter be used as feed to the steam reformer or utilized as fuel.

The invention described herein has been disclosed in terms of specific embodiments and applications. However, these details are not meant to be limiting and other embodiments, in light of this teaching, would be obvious to persons skilled in the art. Accordingly, it is to be understood that the drawings and descriptions are illustrative of the principles of the invention, and should not be construed to limit the scope thereof

I claim:

1. A process for efficiently and effectively utilizing light ends streams in conjunction with the hydroprocessing of biological feedstocks comprising:
   a) feeding a pretreated biological feedstock, comprising triglycerides and optionally fatty acids, and a hydrogen stream directly to a hydroprocessing zone that utilizes at least one solid catalyst to catalyze hydrotreatment reactions and produce a hydroprocessing liquid effluent;
   b) feeding said hydroprocessing liquid effluent and a light hydrocarbon feedstream, said light hydrocarbon feedstream comprising lightends, to a light ends recovery zone wherein said lightends from said light hydrocarbon feedstream are contacted with said hydroprocessing liquid effluent to produce a recovered light ends stream and a gas stripped liquid effluent stream, said recovered light ends stream comprising said lightends recovered from both said light hydrocarbon feedstream subsequent to being contacted with said hydroprocessing liquid effluent within said light ends recovery zone, and said hydroprocessing liquid effluent; and
   c) feeding said recovered light ends stream to a hydrogen production zone wherein said hydrogen production zone chemically converts said lightends recovered from said light hydrocarbon feedstream in said recovered light ends stream to create at least a portion of said hydrogen stream utilized in step (a).

2. The process of claim 1 wherein said gas stripped liquid effluent stream is thereafter further processed for the manufacture of middle distillate hydrocarbon fuels utilizing one or more methods selected from the group consisting of dissolved gas removal, liquid product fractionation, an isomerization reaction step, and/or a hydrocracking reaction step.

3. The process of claim 1 wherein said gas stripped liquid effluent stream is thereafter further processed for the manufacture of middle distillate hydrocarbon fuels utilizing an isomerization step, wherein said isomerization step creates a hydrogen rich vapor effluent stream and wherein said hydrogen rich vapor effluent is thereafter cascaded back to said hydroprocessing zone.

4. The process of claim 1 wherein said gas stripped liquid effluent stream is thereafter further processed for the manufacture of middle distillate hydrocarbon fuels utilizing a hydrocracking step, wherein said hydrocracking step creates a hydrogen rich vapor effluent stream and wherein said hydrogen rich vapor effluent is thereafter cascaded back to said hydroprocessing zone.

5. The process of claim 1 wherein said hydroprocessing zone operates at a temperature of between 145° C. to 400° C., a pressure of between 10 bar to 150 bar, and a LHSV of between 0.1 to 10 $h^{-1}$.

6. The process of claim 1 wherein said solid catalyst comprises a hydrodeoxygenation function comprising at least one metal from group VIII selected from cobalt and nickel, at least one metal from group VIB selected from molybdenum and tungsten, or a mixture of at least one metal from group VIII selected from cobalt and nickel and at least one metal from group VIB selected from molybdenum and tungsten, on a support comprising alumina, silica, silica-alumina, magnesia, clays, or a mixture of at least two of these minerals.

7. The process of claim 1 wherein said light ends recovery zone operates at a pressure of greater than 5 bar.

8. The process of claim 1 wherein a portion of said hydrogen stream created in step c) is used in hydroprocessing outside of said hydroprocessing zone.

9. The process of claim 1 wherein at least a portion of said the hydrogen from the hydrogen production zone is sent to an isomerization step prior to cascading the excess hydrogen to the hydroprocessing zone and wherein the gas stripped liquid effluent is further processed in said isomerization step for the manufacture of middle distillate hydrocarbon fuels.

10. The process of claim 1 wherein said light hydrocarbon stripping feedstream may be a stream comprising methane, ethane, natural gas, fuel gas, deethanizer light product, demethanizer light product, or mixtures thereof.

11. The process of claim 1 wherein said hydroprocessing zone includes a hydrotreatment step and an isomerization step.

12. The process of claim 1 wherein said hydroprocessing zone includes a hydrotreatment step and an isomerization step and wherein said isomerization step utilizes at least one solid isomerization catalyst that is different from said solid catalyst.

13. The process of claim 1 wherein said hydroprocessing zone includes a hydrotreatment step and an isomerization step and wherein said isomerization step utilizes at least one solid isomerization catalyst that is different from said solid catalyst and wherein said solid isomerization catalyst comprises an isomerization function comprising at least one metal selected from palladium (Pd) and platinum (Pt), and a support comprising zeolite, alumina, silica, silica-alumina, magnesia, clays, or a mixture of at least two of these minerals.

14. The process of claim 1 wherein said hydroprocessing zone includes a hydrotreatment step and an isomerization step and wherein said isomerization step utilizes at least one solid isomerization catalyst that is different from said solid catalyst and wherein said solid isomerization catalyst comprises at least one metal from group VIB selected from molybdenum and tungsten, at least one metal in from group VIII selected from nickel and cobalt, or a combination of at least one metal from group VIB selected from molybdenum and tungsten and at least one metal from group VIII selected from nickel and cobalt, on a support comprising zeolite, alumina, silica, silica-alumina, magnesia, clays and mixtures of at least two of these minerals.

15. The process of claim 1 wherein said hydroprocessing zone includes a hydrotreatment step and an isomerization step and wherein said isomerization step operates at an LHSV of between 0.1 to 10 $h^{-1}$.

16. The process of claim 1 wherein said hydroprocessing zone includes a hydrotreatment step and an isomerization step and wherein there is an interstage separation step between said hydrotreatment step and said isomerization step wherein light gases are separated from said middle distillate hydrocarbon fuels.

17. The process of claim 1 wherein said recovered light ends stream is mixed with an additional feed stream prior to feeding said hydrogen production zone.

18. The process of claim 1 wherein said recovered light ends stream is mixed with an additional feed stream prior to feeding said hydrogen production zone and wherein said additional feed stream is supplied from the same source that supplies said light hydrocarbon stripping feedstream.

19. The process of claim 1 wherein said recovered light ends stream is mixed with an additional feed stream prior to feeding said hydrogen production zone and wherein said additional feed stream is supplied from a different source than said light hydrocarbon stripping feedstream.

20. The process of claim 1 wherein said light ends recovery zone further comprises an amine absorption step to remove acid gases.

21. The process of claim 1 wherein said light ends recovery zone further comprises an adsorbent to remove components such as $H_2O$, $H_2S$, $CO_2$, light sulfur hydrocarbons, or any combination thereof.

22. The process of claim 1 wherein said biological feedstock is selected from the group comprising: rapeseed oil, soybean oil, corn oil, coconut oil, olive oil, linseed oil, sunflower oil, palm oil, *Jatropha* oil, mustard oil, peanut oil, hemp oil, cottonseed oil, pork fat, poultry fat, lard, butter, tallow, or any combination thereof.

23. A process for efficiently and effectively utilizing light ends streams in conjunction with the hydroprocessing of biological feedstocks to middle distillate hydrocarbon fuels comprising:
   a) feeding a pretreated biological feedstock, comprising triglycerides and optionally fatty acids, and a hydrogen stream directly to a hydroprocessing zone that utilizes a solid catalyst to catalyze hydrotreatment reactions and produce a hydroprocessing liquid effluent;
   b) feeding said hydroprocessing liquid effluent and a light hydrocarbon feedstream, said light hydrocarbon feedstream comprising lightends, to the light ends recovery zone wherein said light hydrocarbon feedstream is contacted with said hydroprocessing liquid effluent to produce a recovered light ends stream and a stripped liquid effluent stream, said recovered light ends stream comprising said lightends recovered from both said light hydrocarbon feedstream subsequent to being contacted with said hydroprocessing liquid within said light ends recovery zone, and said hydroprocessing liquid;

c) feeding said recovered light ends stream comprising said lightends recovered from said light hydrocarbon feedstream to a light ends separation zone to create an LPG stream and a light residual gas stream, said light residual gas stream comprising lightends recovered from said recovered light ends stream; and d) feeding said light residual gas stream to a hydrogen production zone wherein said hydrogen production zone utilizes said lightends recovered from said said recovered light ends stream in said light residual gas stream as feedstock to create at least a portion of said hydrogen stream utilized in step (a).

24. The process of claim 23 wherein said gas stripped liquid effluent stream is thereafter further processed for the manufacture of middle distillate hydrocarbon fuels utilizing one or more methods selected from the group consisting of dissolved gas removal, liquid product fractionation, an isomerization reaction step, and/or a hydrocracking reaction step.

25. The process of claim 23 wherein said gas stripped liquid effluent stream is thereafter further processed for the manufacture of middle distillate hydrocarbon fuels utilizing an isomerization step, wherein said isomerization step creates a hydrogen rich vapor effluent stream and wherein said hydrogen rich vapor effluent is thereafter cascaded back to said hydroprocessing zone.

26. The process of claim 23 wherein said gas stripped liquid effluent stream is thereafter further processed for the manufacture of middle distillate hydrocarbon fuels utilizing a hydrocracking step, wherein said hydrocracking step creates a hydrogen rich vapor effluent stream and wherein said hydrogen rich vapor effluent is thereafter cascaded back to said hydroprocessing zone.

27. The process of claim 23 wherein said hydroprocessing zone operates at a temperature of between 145° C. to 400° C., a pressure of between 10 bar to 150 bar, and a LHSV of between 0.1 to 10 h$^{-1}$.

28. The process of claim 23 wherein said solid catalyst comprises a hydrodeoxygenating function comprising at least one metal from group VIII selected from cobalt and nickel, at least one metal from group VIB selected from molybdenum and tungsten, or a mixture of at least one metal from group VIII selected from cobalt and nickel and at least one metal from group VIB selected from molybdenum and tungsten, on a support comprising alumina, silica, silica-alumina, magnesia, clays, or a mixture of at least two of these minerals.

29. The process of claim 23 wherein said light ends recovery zone operates at a pressure of greater than 5 bar.

30. The process of claim 23 wherein said hydroprocessing zone in step a) produces a vapor effluent in addition to said hydroprocessing liquid effluent and wherein said vapor effluent is further separated into a hydrocarbon enriched stream and hydrogen enriched stream and wherein said hydrocarbon enriched stream is thereafter mixed with said recovered light ends stream and wherein the said hydrogen enriched stream and the mixture of said hydrocarbon enriched stream and said recovered light ends stream are separately sent to said hydrogen production zone.

31. The process of claim 23 wherein a portion of said hydrogen stream created in step d) is used in hydroprocessing outside of said hydroprocessing zone.

32. The process of claim 23 wherein said light hydrocarbon stripping feedstream may be a stream comprising methane, ethane, natural gas, fuel gas, deethanizer light product, demethanizer light product, or mixtures thereof.

33. The process of claim 23 wherein said hydroprocessing zone includes a hydrotreatment step and an isomerization step.

34. The process of claim 23 wherein said hydroprocessing zone includes a hydrotreatment step and an isomerization step and wherein said isomerization step utilizes at least one solid isomerization catalyst that is different from said solid catalyst.

35. The process of claim 23 wherein said hydroprocessing zone includes a hydrotreatment step and an isomerization step and wherein said isomerization step utilizes at least one solid isomerization catalyst that is different from said solid catalyst and wherein said solid isomerization catalyst comprises an isomerization function comprising at least one metal selected from palladium (Pd) and platinum (Pt), and a support comprising zeolite, alumina, silica, silica-alumina, magnesia, clays, or a mixture of at least two of these minerals.

36. The process of claim 23 wherein said hydroprocessing zone includes a hydrotreatment step and an isomerization step and wherein said isomerization step utilizes at least one solid isomerization catalyst that is different from said solid catalyst and wherein said solid isomerization catalyst comprises at least one metal from group VIB selected from molybdenum and tungsten, at least one metal in from group VIII selected from nickel and cobalt, or a combination of at least one metal from group VIB selected from molybdenum and tungsten and at least one metal in from group VIII selected from nickel and cobalt, on a support comprising zeolite, alumina, silica, silica-alumina, magnesia, clays, or a mixture of at least two of these minerals.

37. The process of claim 23 wherein said hydroprocessing zone includes a hydrotreatment step and an isomerization step and wherein said isomerization step operates at an LHSV of between 0.1 to 10 h$^{-1}$.

38. The process of claim 23 wherein said hydroprocessing zone in step a) includes a hydrotreatment step and an isomerization step and wherein there is an interstage separation step between said hydrotreatment step and said isomerization.

39. The process of claim 23 wherein said recovered light ends stream is mixed with an additional feed stream prior to feeding said hydrogen production zone.

40. The process of claim 23 wherein said recovered light ends stream is mixed with an additional feed stream prior to feeding said hydrogen production zone and wherein said additional feed stream is supplied from the same source that supplies said light hydrocarbon feedstream.

41. The process of claim 23 wherein said recovered light ends stream is mixed with an additional feed stream prior to feeding said hydrogen production zone and wherein said additional feed stream is supplied from a different source than said light hydrocarbon feedstream.

42. The process of claim 23 wherein said light ends recovery zone further comprises an amine absorption step to remove acid gases.

43. The process of claim 23 wherein said light ends recovery zone further comprises an adsorbent to remove components such as $H_2O$, $H_2S$, $CO_2$, light sulfur hydrocarbons, or any combination thereof.

44. The process of claim 23 wherein said biological feedstock is selected from the group comprising: rapeseed oil, soybean oil, corn oil, coconut oil, olive oil, linseed oil, sunflower oil, palm oil, *Jatropha* oil, mustard oil, peanut oil, hemp oil, cottonseed oil, pork fat, poultry fat, lard, butter, tallow, or any combination thereof.

* * * * *